US012685886B2

(12) United States Patent
Kjellman

(10) Patent No.: US 12,685,886 B2
(45) Date of Patent: Jul. 21, 2026

(54) CONTINUOUS CABLE INSTALLATION OF FIRE DETECTION LINKS

(71) Applicant: KIDDE-FENWAL, LLC, Ashland, MA (US)

(72) Inventor: Thomas Kjellman, Uxbridge, MA (US)

(73) Assignee: Kidde-Fenwal, LLC, Ashland, MA (US)

(*) Notice: Subject to any disclaimer, the term of this patent is extended or adjusted under 35 U.S.C. 154(b) by 493 days.

(21) Appl. No.: 18/191,121

(22) Filed: Mar. 28, 2023

(65) Prior Publication Data

US 2023/0310916 A1 Oct. 5, 2023

Related U.S. Application Data

(60) Provisional application No. 63/325,999, filed on Mar. 31, 2022.

(51) Int. Cl.
*A62C 37/48* (2006.01)
*A62C 3/00* (2006.01)
*A62C 37/42* (2006.01)

(52) U.S. Cl.
CPC .............. *A62C 37/48* (2013.01); *A62C 3/006* (2013.01); *A62C 37/42* (2013.01)

(58) Field of Classification Search
CPC ......... A62C 37/48; A62C 3/006; A62C 37/42; A62C 37/12; F16K 17/383; H01H 37/76
USPC ......................... 169/56, 42; 137/72; 337/416
See application file for complete search history.

(56) References Cited

U.S. PATENT DOCUMENTS 1,191,919 A * 7/1916 Hawkins ................ A62C 37/12 169/42
1,508,376 A * 9/1924 Adams, Jr. ............. A62C 37/12 169/42
3,348,617 A * 10/1967 Macartney ............. F16G 15/04 169/42
3,463,236 A * 8/1969 Flajole .................. A62C 37/12 169/59
5,120,152 A * 6/1992 Gueli ..................... A62C 37/12 169/42
5,273,119 A 12/1993 Dick
6,404,322 B1 * 6/2002 Ruegsegger .......... F16B 31/007 337/159

(Continued)

FOREIGN PATENT DOCUMENTS

WO WO-2019084149 A1 * 5/2019 ............. A62C 37/48

OTHER PUBLICATIONS

Extended European Search Report for European Application No. 23164150.7; Report Mail Date Aug. 22, 2023 (7 Pages).

*Primary Examiner* — Kevin Edward Schwartz
(74) *Attorney, Agent, or Firm* — Honigman LLP; Andrew J. Boes

(57) ABSTRACT

A detection bracket for use in a fire suppression system includes a main body and at least one support plate positioned adjacent to the main body. The at least one support plate has an opening formed therein for receiving an actuation cable wrapped about the main body. The at least one support plate is movable from a first position to a second position relative to the main body in response to a predetermined condition. A tension in the actuation cable receivable within the opening is less when the at least one support plate is in the second position than when the at least one support plate is in the first position.

10 Claims, 4 Drawing Sheets

(56) References Cited

U.S. PATENT DOCUMENTS

| | | | | |
|---|---|---|---|---|
| 7,199,697 | B2 * | 4/2007 | Tanaka | H01H 37/761 337/159 |
| 11,199,286 | B1 * | 12/2021 | Beranek | F16L 55/1141 |
| 2021/0093908 | A1 * | 4/2021 | VerBrugge | A62C 37/12 |
| 2021/0370115 | A1 | 12/2021 | Nellman | |

* cited by examiner

CONTINUOUS CABLE INSTALLATION OF FIRE DETECTION LINKS

CROSS-REFERENCE TO RELATED APPLICATIONS

This application claims the benefit of U.S. Application No. 63/325,999, filed Mar. 31, 2022, the contents of which are incorporated by reference herein in their entirety.

BACKGROUND

Embodiments of the present disclosure relate to a fusible mechanical linkage, and more particularly to fusible mechanical linkages for controlling tension in fire suppression system activation cables.

Fire suppression systems, such as in commercial kitchens, commonly include a suppressant reservoir housing a fire suppressant A valve retains the suppressant in the reservoir until fire is detected, at which point the valve is actuated to allow suppressant to issue from the reservoir and into the area protected by the fire suppression system. Actuation typically occurs by operation of a fusible link and cable, which connects the fusible link to the valve.

Fusible links are mechanical devices that generally consist of two pieces of metal connected to one another by a fusible alloy. Below a specific temperature the fusible alloy fixes the two pieces of metal to one another. When exposed to temperatures above the specific temperature the fusible alloy softens, allowing the two pieces of metal to separate from one another with relatively little force. In fire suppression systems fusible links generally communicate cable tension until the specific temperature is reached at which point the tension present in the cable breaks the fusible link and unloads to actuate the valve. Fusible links are commonly employed in cooperation with cable take-up devices, which remove slack and load the cable in tension.

Such conventional methods and systems have generally been considered satisfactory for their intended purpose. However, installing and adjusting fusible mechanical linkages and fire suppression systems, and servicing such linkages and systems, may be complicated and time-consuming due to the complication of the systems.

BRIEF DESCRIPTION

According to an embodiment, a detection bracket for use in a fire suppression system includes a main body and at least one support plate positioned adjacent to the main body. The at least one support plate has an opening formed therein for receiving an actuation cable wrapped about the main body. The at least one support plate is movable from a first position to a second position relative to the main body in response to a predetermined condition. A tension in the actuation cable receivable within the opening is less when the at least one support plate is in the second position than when the at least one support plate is in the first position.

In addition to one or more of the features described herein, or as an alternative, in further embodiments the predetermined condition is a temperature at or above a temperature threshold.

In addition to one or more of the features described herein, or as an alternative, in further embodiments the main body and the at least one support plate are in overlapping arrangement when the at least one support plate is in the first position.

In addition to one or more of the features described herein, or as an alternative, in further embodiments the at least one support plate is laterally offset from the main body when the at least one support plate is in the second position.

In addition to one or more of the features described herein, or as an alternative, in further embodiments the main body and at least a portion of the at least one support plate are in overlapping arrangement when the at least one support plate is in the second position.

In addition to one or more of the features described herein, or as an alternative, in further embodiments comprising a fusible linkage disposed between the at least one support plate and the main body, the fusible linkage fixing the at least one support plate to the main body in the first position.

In addition to one or more of the features described herein, or as an alternative, in further embodiments the at least one support plate further comprises a first support plate and a second support plate.

In addition to one or more of the features described herein, or as an alternative, in further embodiments the first support plate is movable relative to the main body between the first position and the second position, and the second support plate is stationary.

In addition to one or more of the features described herein, or as an alternative, in further embodiments both the first support plate and the second support plate are movable from the first position to the second position relative to the main body in response to the predetermined condition.

In addition to one or more of the features described herein, or as an alternative, in further embodiments comprising an actuation cable extending around a major surface of the main body and through the opening formed in the at least one support plate.

According to an embodiment, a detection bracket for use in a fire suppression system includes a main body having a major surface and at least one support plate positioned adjacent to the main body. The at least one support plate has an opening formed therein for receiving an actuation cable wrapped about the major surface. A fusible linkage is disposed between the at least one support plate and the main body. The fusible linkage affixes the at least one support plate to the main body below a predetermined temperature and allows tension carried by the actuation cable extending through the at least one support plate to move the at least one support plate relative to the main body at temperatures above the predetermined temperature.

In addition to one or more of the features described herein, or as an alternative, in further embodiments at temperatures below the predetermined temperature, the main body and the at least one support plate are in overlapping arrangement.

In addition to one or more of the features described herein, or as an alternative, in further embodiments at temperatures above the predetermined temperature, the at least one support plate is laterally offset from the main body.

In addition to one or more of the features described herein, or as an alternative, in further embodiments at temperatures above the predetermined temperature, the at least one support plate is in overlapping arrangement with the main body.

In addition to one or more of the features described herein, or as an alternative, in further embodiments the at least one support plate further comprises a first support plate and a second support plate, and another fusible linkage is disposed between the first support plate and the second support plate.

According to an embodiment, a fire suppression system includes at least one source of fire suppression agent and a plurality of detection brackets operably coupled to the at least one source of fire suppression agent by an actuation cable. At least one of the plurality of detection brackets includes a main body and at least one support plate positioned adjacent to the main body. The at least one support plate has an opening formed therein for receiving the actuation cable. The at least one support plate is movable from a first position to a second position relative to the main body in response to a predetermined condition to release a tension in the actuation cable and fire suppression agent is releasable from the at least one source of fire suppression agent in response to the release of tension in the actuation cable.

In addition to one or more of the features described herein, or as an alternative, in further embodiments the at least one detection bracket further comprises a fusible linkage disposed between the at least one support plate and the main body, the fusible linkage fixing the at least one support plate to the main body in the first position.

In addition to one or more of the features described herein, or as an alternative, in further embodiments the predetermined condition is a temperature of the fusible linkage, wherein the fusible linkage fixes the at least one support plate to the main body below a predetermined temperature and allows tension carried by the actuation cable extending through the at least one support plate to move the at least one support plate from the first position to the second position at temperatures above the predetermined temperature.

In addition to one or more of the features described herein, or as an alternative, in further embodiments the main body and the at least one support plate are in overlapping arrangement when the at least one support plate is in the first position.

In addition to one or more of the features described herein, or as an alternative, in further embodiments the at least one support plate is laterally offset from the main body when the at least one support plate is in the second position.

In addition to one or more of the features described herein, or as an alternative, in further embodiments the at least one support plate further comprises a first support plate and a second support plate and both the first support plate and the second support plate are movable from the first position to the second position relative to the main body in response to the predetermined condition.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
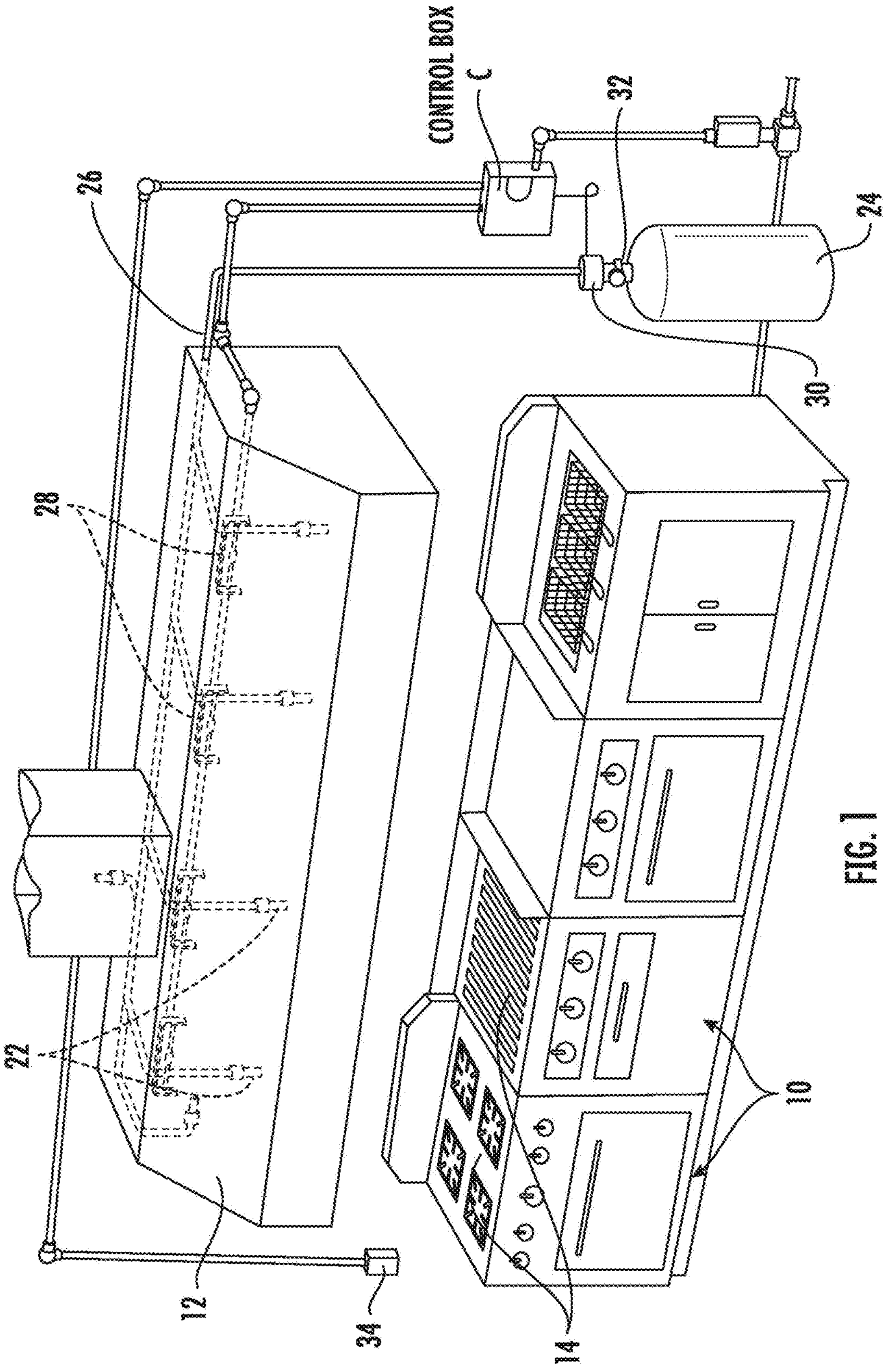
FIG. 1 is a schematic diagram of an exemplary system for delivering a fire suppression agent to at least one cooking appliance according to an embodiment.

With reference now to FIG. 1, an example of a system 20 for delivering a fire suppression agent to one or more cooking appliances 10 is illustrated. The fire suppression system 20 may be located separate or remotely from the cooking appliance 10, such as within a vent hood 12, or alternatively, may be integrated or housed at least partially within a portion of the cooking appliance 10. It should be understood that the configuration of the fire suppression system 20 may vary based on the overall structural design of the cooking appliance 10. The fire suppression system 20 includes one or more spray nozzles 22 associated with the cooking appliance 10 and a source of fire suppression agent 24 in the form of at least one self-contained pressurized canister. In embodiments including a plurality of cooking appliances 10, one or more spray nozzles 22 may be dedicated to each cooking appliance 10, or alternatively, one or more evenly spaced spray nozzles 22 may be used for all of the cooking appliances 10.

The source of fire suppression agent 24 is arranged in fluid communication with the nozzles 22 via an agent delivery path defined by a delivery piping system 26. In the event of a fire, the fire suppression agent is allowed to flow through the delivery piping system 26 to the one or more spray nozzles 22 for release directly onto an adjacent cooking hazard area 14 of the one or more cooking appliances 10.

Those skilled in the art will readily appreciate that the fire suppression agent can be selected from materials such as water, dry chemical agent, wet chemical agent, or the like. Further, the source of fire suppression agent 24 may additionally contain a gas propellant for facilitating the movement of the fire suppression agent through the delivery piping system 26. However, embodiments where the propellant is stored separately from the fire suppression agent are also contemplated herein.

In an embodiment, the fire suppression system 20 is actuated in response to a fire sensing device (illustrated schematically at 28), such as a smoke detector or a heat sensor, for example. In response to heat or smoke exceeding an allowable limit, a control box C will direct a signal to an actuator 30 to open a valve 32 to allow the fire suppression agent to flow from the source 24 to the nozzles 22. For example, in an embodiment the fire sensing device is a heat sensor including an activator bulb. When a fire is present, the increased heat resulting from the flames will cause the activator bulb to break, thereby releasing the tension on an actuation cable connecting the fire sensing device to the control box C. Alternatively, or in addition, the fire suppression system 20 may include a manual activation system 34, also referred to herein as a manual pull station, configured to actuate the control box C to activate the valve 32 to initiate operation of the fire suppression system 20.

Figure 2A:
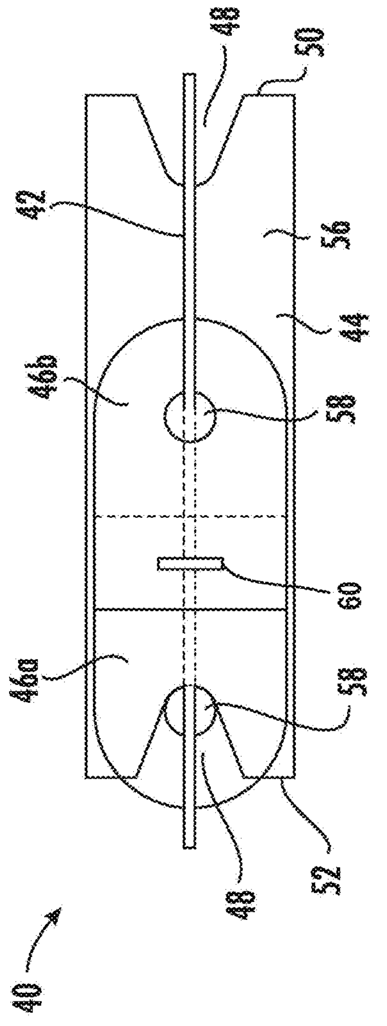
FIG. 2A is a bottom view of an exemplary detection bracket having support plates in a first position according to an embodiment.
Figure 2B:
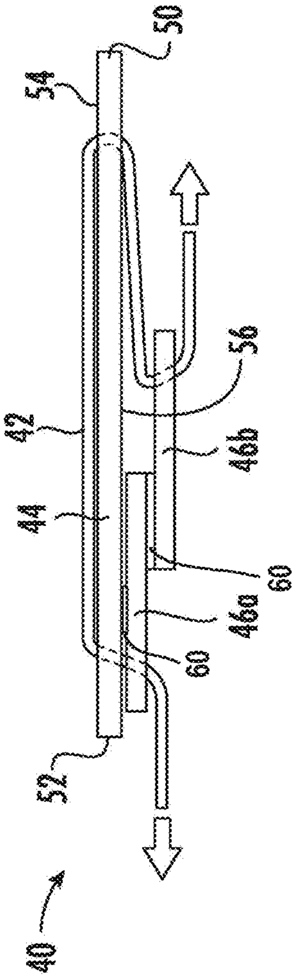
FIG. 2B is a cross-sectional side view of the detection bracket of FIG. 2A according to an embodiment.
Figure 2C:
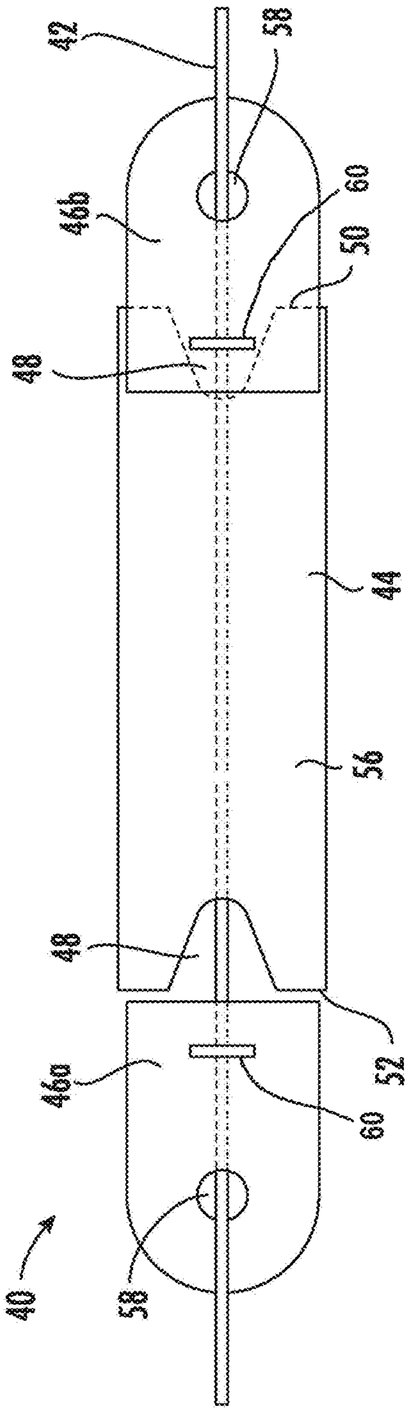
FIG. 2C is a bottom view of an exemplary detection bracket having support plates in a second position according to an embodiment.
Figure 2D:
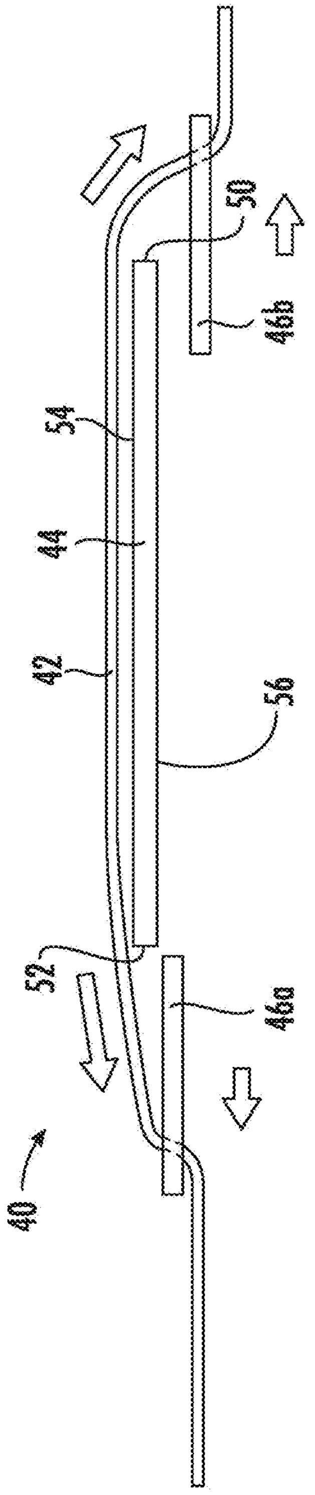
FIG. 2D is a cross-sectional side view of the detection bracket of FIG. 2C according to an embodiment.
Figure 3B:
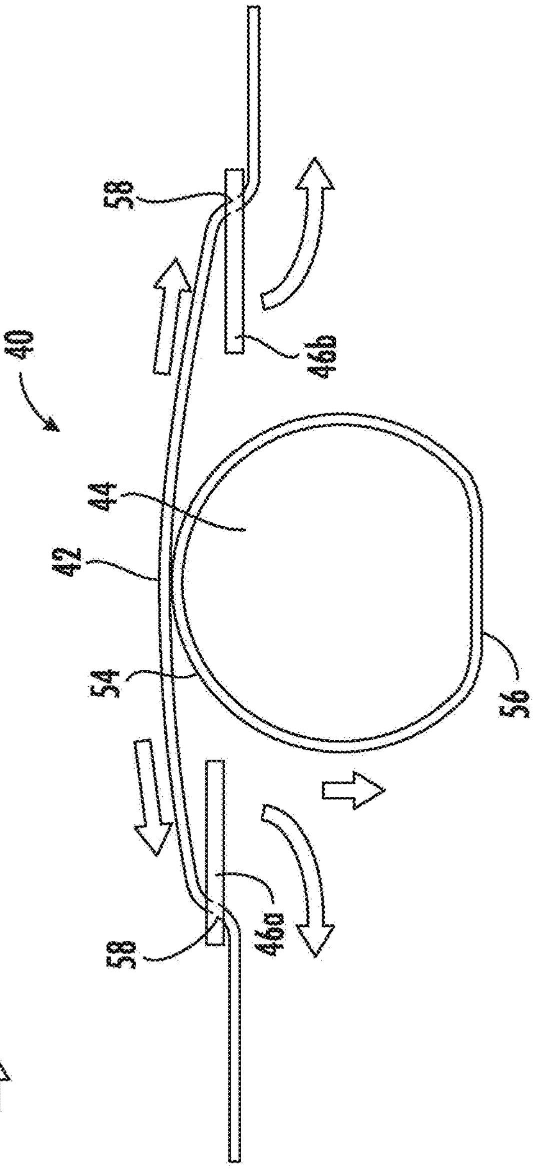
FIG. 3B is a side view of the detection bracket of FIG. 3A having support plates in a second position according to an embodiment.
Figure 3A:
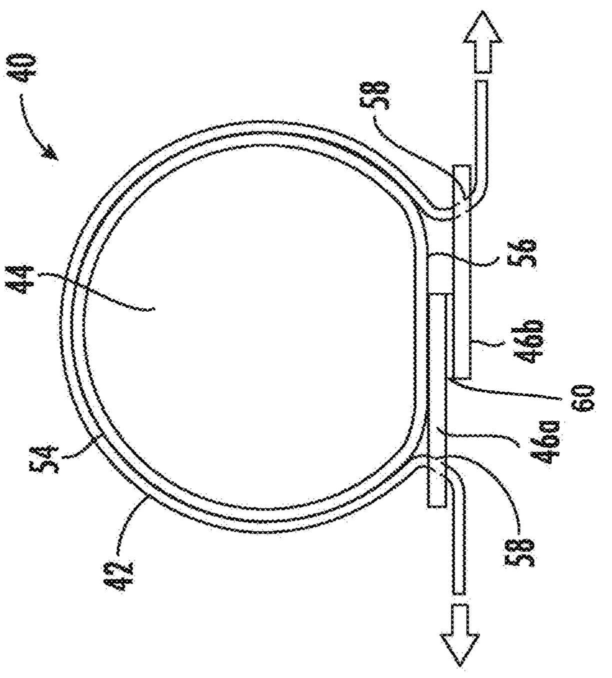
FIG. 3A is a side view of an exemplary detection bracket having support plates in a first position according to an embodiment.

With reference now to FIGS. 2A-3B, exemplary embodiments of a detection bracket 40 connectable to an actuation cable 42 and operable as a fire sensing device 28 within the fire suppression system 20 are illustrated. In each of the embodiments, the detection bracket 40 includes a main body 44 and at least one support plate 46. In the illustrated, non-limiting embodiment of FIGS. 2A-2D, the main body 44 has an elongated, generally rectangular configuration. Alternatively, in the embodiment illustrated in FIGS. 3A and 3B, the main body 44 has a generally circular cross-sectional configuration. Accordingly, it should be understood that a main body 44 having any suitable configuration is within the scope of the disclosure (e.g., to facilitate the displacement of the actuation cable 42 and the release of tension in the actuation cable 42 in the event of a fire). In an embodiment, the main body 44 may include one or more features to facilitate installation or wrapping of the actuation cable 42 about the main body 44. For example, as shown in FIGS. 2A and 2C, V-shaped slots 48 are formed at opposite ends 50, 52 of the main body 44 through which the actuation cable 42 may extend. Although not shown, the feature of the main body 44 may alternatively or additionally include a groove, protrusion, or combination thereof that forms a track extending over a major surface 54 of the main body 44.

Regardless of the configuration of the main body 44, the main body 44 may include a substantially flat or planar edge 56 arranged opposite the major surface 54, and the at least one support plate 46 may be positioned at or generally adjacent to the flat edge 56. Although the flat edge 56 is illustrated as being at a bottom of the main body 44, it should be understood that embodiments having another configuration, such as where the flat edge 56 is an upper surface for example, are within the scope of the disclosure.

In the illustrated, non-limiting embodiments shown in the FIGS., the detection bracket 40 includes a first support plate 46*a* and a second support plate 46*b*. However, embodiments, having only a single support plate, or more than two support plates are also contemplated herein. The plurality of support plates 46*a*, 46*b*, may be substantially identical, or alternatively, may have different configurations. In the non-limiting embodiments illustrated in FIGS. 2A-2D and 3A-3B, the first support plate 46*a* and the second support plate 46*b* are substantially identical but are rotated 180 degrees relative to each other. Embodiments where the support plates 46*a*, 46*b* are arranged in another configuration are also within the scope of the disclosure.

As shown, each support plate 46*a*, 46*b* has an opening or through hole 58 formed therein configured to receive the actuation cable 42. In an embodiment, an end of the actuation cable 42 is woven through the opening 58 in the first support plate 46*a*, about the major surface 54 of the main body 44, and through the opening 58 formed in the second support plate 46*b* sequentially.

One or more of the support plates 46*a*, 46*b* is movable relative to the main body 44 between a first position and a second position. Although both the first support plate 46*a* and the second support plate 46*b* are illustrated as being movable in the FIGS., embodiments where only one of the support plates 46*a*, 46*b* is movable are also within the scope of the disclosure. When in the first position, shown in FIGS. 2A, 2B, and 3A, the movable support plates 46*a*, 46*b* are in overlapping arrangement with the main body 44. In the illustrated, non-limiting embodiment, the support plates 46*a*, 46*b* are disposed vertically underneath the main body 44, adjacent to the flat edge 56. In the second position, shown in FIGS. 2C, 2D, and 3B, the support plates 46*a*, 46*b* may be laterally offset from the main body 44 as shown, or alternatively, may be in partial overlapping arrangement with the main body 44. In embodiments where the support plate 46*a*, 46*b* partially overlaps the main body 44 in the second position, the portion of the support plate 46*a*, 46*b* in overlapping arrangement with the main body 44 in the second position is significantly less than when in the first position.

The movable support plate 46 *a*, 46 *b* is configured to move, for example translate, between the first position and the second position in response to a predetermined condition. In the illustrated, non-limiting embodiment, the at least one movable support plate, such as the first support plate 46 *a* is affixed to a portion of the main body 44, such as the edge 56 for example, via a fusible linkage 60. Alternatively, or in addition, the second support plate 46 *b* may be affixed to the first support plate 46 *a* via a fusible linkage 60. Although the support plates 26 *a*, 46 *b* are shown as being stacked when connected by the fusible linkage 60, embodiments where abutting ends of the support plates 46 *a*, 46 *b* are connected by a fusible linkage 60 are also contemplated herein. In an embodiment, the fusible linkage 60 arranged at the interface between the first and second support plates 46 *a*, 46 *b* is axially aligned with the fusible linkage 60 arranged between the first support plate 46 *a* and the main body 44.

The fusible linkage 60 has a melting point or temperature threshold associated with a hazard which the fire suppression system 20 is configured to detect. In an embodiment, the fusible linkage 60 is formed from a material, including but not limited to solder or braze, each of which has a melting point approximating that of a grease or cooking oil fire. Accordingly, in response to heat that exceeds the predetermined temperature or predetermined threshold, such as resulting from a fire, the fusible linkage 60 softens, thereby allowing at least one of the support plates 46 *a*, 46 *b* to move relative to the main body 44. As a result of the tension acting on the actuation cable 42 connected to the support plates 46 *a*, 46 *b*, and wound around the main body 44, the support plates 46 *a*, 46 *b* will move outwardly in opposite directions, from the first position to the second position. This movement reduces the tension within the cable 42 by unwrapping the cable 42 from about major surface 54 of the main body 44.

Multiple detection brackets 40 as described herein can be positioned over a span of a single, continuous actuation cable 42. Accordingly, the cutting and crimping operations associated with creating multiple terminated segments of cable between detection links can be eliminated (or at least reduced). In addition, the detection brackets 40 can be repositioned and reconfigured within the field without damaging the cable 42.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A detection bracket for use in a fire suppression system, the detection bracket comprising:

an actuation cable and a main body having a top surface opposite a bottom surface;

a first support plate and a second support plate positioned underneath the main body so as to be opposite of the bottom surface, the first support plate and the second support plate each having an opening formed therein, each opening receiving the actuation cable wrapped about the top surface of the main body; and a fusible linkage fixing one of the first support plate and the second support plate to the bottom surface, wherein the first support plate and the second support plate are movable from a first position to a second position relative to the main body in response to a predetermined condition, wherein the predetermined condition is a temperature being at or above a temperature threshold, the fusible linkage releasing a corresponding one of the first support plate and the second support plate from the main body in response to the predetermined condition so as to allow the actuation cable to release.

2. The detection bracket of claim 1, wherein the main body and the first support plate and the second support plate are in overlapping arrangement when the corresponding one of the first support plate and the second support plate is in the first position.

3. The detection bracket of claim 2, wherein the corresponding one of the first support plate and the second support plate is laterally offset from the main body when the corresponding one of the first support plate and the second support plate is in the second position.

4. The detection bracket of claim 2, wherein the main body and at least a portion of one of the first support plate and the second support plate are in overlapping arrangement when the corresponding one of the first support plate and the second support plate is in the second position.

5. The detection bracket of claim 1, wherein the first support plate is movable relative to the main body between the first position and the second position, and the second support plate is stationary.

6. The detection bracket of claim 1, wherein both the first support plate and the second support plate are movable from the first position to the second position relative to the main body in response to the predetermined condition.

7. A detection bracket for use in a fire suppression system, the detection bracket comprising:

an actuation cable and a main body having a major surface and a minor surface disposed on an opposite side from the major surface;

a first support plate and a second support plate, positioned adjacent to the minor surface of the main body, each of the first support plate and second support plate having an opening formed therein, each opening receiving the actuation cable wrapped about the major surface of the main body; and a fusible linkage disposed between at least one support plate of the first support plate and the second support plate and the minor surface of the main body, the fusible linkage fixing the at least one support plate to the main body below a predetermined temperature and allowing tension carried by the actuation cable extending through the at least one support plate to move the at least one support plate relative to the main body at temperatures above the predetermined temperature.

8. The detection bracket of claim 7, wherein at temperatures below the predetermined temperature, the main body and at least one of the first support plate and the second support plate are in overlapping arrangement.

9. The detection bracket of claim 8, wherein at temperatures above the predetermined temperature, the at least one support plate is laterally offset from the main body.

10. The detection bracket of claim 8, wherein at temperatures below the predetermined temperature, the at least one support plate is in overlapping arrangement with the main body.

* * * * *